A. K. EATON.
Multipolar Magnet.

No. 204,141. Patented May 28, 1878.

WITNESSES:

INVENTOR:
Asahel K. Eaton

UNITED STATES PATENT OFFICE.

ASAHEL K. EATON, OF BROOKLYN, NEW YORK.

IMPROVEMENT IN MULTIPOLAR MAGNETS.

Specification forming part of Letters Patent No. 204,141, dated May 28, 1878; application filed April 12, 1878.

*To all whom it may concern:*

Be it known that I, ASAHEL K. EATON, of Brooklyn, State of New York, have invented a Multipolar Magnet, of which the following is a specification:

The nature of my invention consists in the construction of a magnet, either permanent or temporary, in such a manner that two or more similar poles are reacting with one of the opposite character, the latter being equivalent to all the others.

The general character of the magnet in different forms is illustrated in detail by the accompanying drawings in its simplest form.

Figure 1:
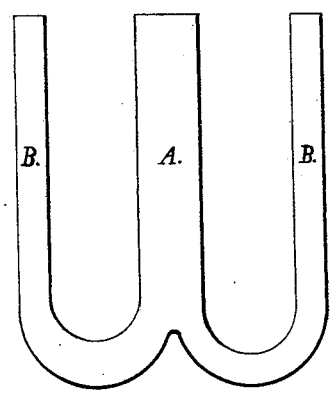
Figure 2:
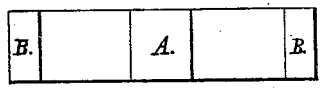

The multipolar magnet consists of a piece of magnetized steel, such as represented by Figures 1 and 2 of the drawings, in which the central bar A indicates, say, the north pole, and B B two poles of half the size of the former, and of the opposite polarity—*i. e.*, two south poles that just balance the single central pole.

Upon the same principle multipolar magnets may be constructed having three, four, six, or more poles of a given polarity balancing one of the opposite character.

Figure 3:
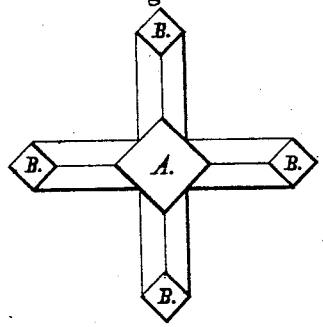
Figure 4:
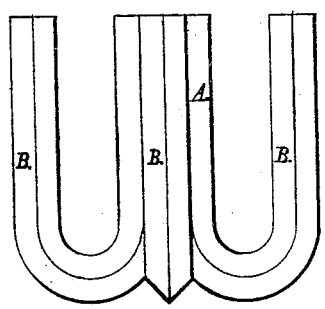

The drawings represent two of the more useful of these. One (represented by Figs. 3 and 4) has four poles, B B B B, balancing a single pole, A.

Figure 5:
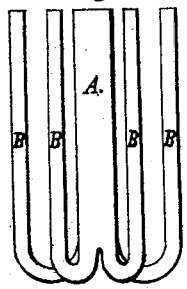
Figure 6:
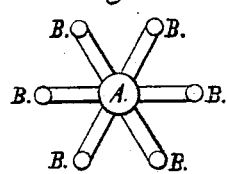

Figs. 5 and 6 represent a magnet having six given poles, B B B B B B, balanced by one single pole, A, of the opposite polarity.

These forms of magnets are of great value, not only in the production of greater simple magnetic effects than can be produced by the ordinary magnet of corresponding size, but because I am enabled to produce and utilize induced magneto-electric currents much more effectually than by any form of magnet hitherto in use.

The magnet represented by Figs. 5 and 6 is especially adapted to any work when it becomes necessary to act upon an armature in the form of a circular disk.

It is evident that any required number of small poles of similar character may be similarly combined with and symmetrically arranged around an equivalent single pole of the opposite kind.

I claim as my invention—

A multipolar magnet having one pole of a given polarity balanced by two, three, or more poles of the opposite character, distributed symmetrically with reference to the main pole and to one another.

ASAHEL K. EATON.

Witnesses:
L. V. D. HARDENBERGH,
FRANK W. STONE.